United States Patent [19]
Besler et al.

[11] Patent Number: 5,888,165
[45] Date of Patent: Mar. 30, 1999

[54] MULTIPLE-SPEED AXLE MECHANISM

[75] Inventors: Ernie Besler, Washington; Rex R. Corless, Sterling Heights, both of Mich.; John H. Tanzer, Punta Gorda, Fla.

[73] Assignee: Ford Global Technologies, Inc., Dearborn, Mich.

[21] Appl. No.: 854,256

[22] Filed: May 9, 1997

[51] Int. Cl.$^6$ .................................................. F16H 37/08
[52] U.S. Cl. .......................................................... 475/204
[58] Field of Search ..................................... 475/204, 206

[56] References Cited

U.S. PATENT DOCUMENTS

| | | | |
|---|---|---|---|
| 2,326,754 | 8/1943 | Buckendale | 475/206 |
| 2,438,620 | 3/1948 | Russell | 475/204 |
| 2,443,590 | 6/1948 | Alden | 475/204 |
| 2,488,756 | 11/1949 | Baker . | |
| 2,516,850 | 8/1950 | Brownyer | 475/204 |
| 2,783,661 | 3/1957 | Dryer | 475/206 |
| 3,031,900 | 5/1962 | Stump | 475/204 |
| 3,413,873 | 12/1968 | Bixby | 475/204 |
| 3,503,280 | 3/1970 | Bopp | 475/204 |
| 4,286,480 | 9/1981 | Dickie . | |
| 4,347,762 | 9/1982 | Holdeman . | |
| 4,418,585 | 12/1983 | Pierce . | |
| 4,440,042 | 4/1984 | Holdeman . | |
| 4,509,389 | 4/1985 | Vahratian et al. . | |
| 4,604,908 | 8/1986 | Dolan . | |
| 4,607,541 | 8/1986 | Miura et al. . | |
| 4,690,015 | 9/1987 | Nagano et al. . | |
| 4,711,136 | 12/1987 | Yoshinaka et al. . | |
| 4,713,980 | 12/1987 | Ida et al. . | |
| 4,719,814 | 1/1988 | Ida et al. . | |
| 4,723,459 | 2/1988 | Yoshinaka et al. . | |
| 4,836,049 | 6/1989 | Moan . | |
| 4,838,121 | 6/1989 | Takeshita et al. . | |
| 4,841,803 | 6/1989 | Hamano et al. . | |
| 4,841,804 | 6/1989 | Miura et al. . | |
| 4,846,016 | 7/1989 | Takeuchi et al. . | |
| 4,967,616 | 11/1990 | Minami et al. . | |
| 4,978,328 | 12/1990 | Pierce . | |
| 5,197,355 | 3/1993 | Sherman et al. . | |
| 5,346,442 | 9/1994 | Eastman . | |
| 5,511,448 | 4/1996 | Kameda et al. . | |
| 5,538,482 | 7/1996 | Tanzer et al. . | |
| 5,554,080 | 9/1996 | Dangel . | |

*Primary Examiner*—Dirk Wright

[57] ABSTRACT

In a powertrain including a multiple-speed axle assembly housed in an axle case, the mullet-speed axle includes an input shaft, an output shaft and a gearset having first and second members. The first and second members are adapted to produce a direct drive connection between the input shaft and output shaft when said members are connected mutually and to underdrive the output shaft in relation to the input shaft when said members are mutually disconnected and the first member is connected with the case. A coupling is provided for mutually connecting and disconnecting the first and second members and for connecting the first member with the case. A selector actuates the coupling to mutually connect and disconnect the members.

20 Claims, 4 Drawing Sheets

MULTIPLE-SPEED AXLE MECHANISM

BACKGROUND OF THE INVENTION

1. Field of the Invention

This invention relates to the field of power transmission in a driveline for an automotive vehicle. More particularly, it pertains to a multiple-speed final drive mechanism for use with a transmission mechanism.

2. Description of the Prior Art

To improve fuel economy and performance of a powertrain equipped with a multiple-speed transmission, attempts are being made to increase the number of forward speed ratios produced by the transmission. Adding gears broadens the span from first to top gear and reduces the size of steps between gears. Small step sizes help to maintain engine speed closer to its optimal value. The transmission delivers power smoother, and reduces the need to maintain desired engine speed by adjusting the throttle position.

Various attempts have been made to increase the number of speed ratios produced by an automatic transmission by adding an auxiliary gearset in the torque delivery path at a location either before the existing planetary gearset or between a multiple-speed planetary gearset and the final drive gearset. The auxiliary gearsets are located coaxially with the engine crankshaft, or coaxially with the output shaft. An example of the former arrangement is disclosed in U.S. Pat. No. 5,474,503 assigned to the assignee of the present invention.

A two-speed axle mechanism is provided in U.S. Pat. No. 5,538,482, assigned to the assignee of the present invention. The two-speed axle of the '482 patent includes a planetary gearset, an overrunning brake, a brake band, and a friction clutch. Another form of the axle mechanism includes gears formed on the input shaft and output shaft, a planet gear wheel rotatably supported on a carrier, the gears of the wheel meshing with the gears on the shafts. A spring-applied clutch connects the output shaft to the carrier, and an hydraulically-actuated brake releases the clutch and holds the carrier against revolution on a casing. However, such an arrangement may require the axle to be drivably disconnected to ensure an acceptable change of the gear ratio of the axle.

A principal objective of a multiple-speed axle arrangement, according to the present invention, is to reduce the overall size, weight, complexity, and cost required to produce a manually or automatically operated drivetrain with five or more forward gear ratios. Further objectives include minimizing the cost and complexity of such a two-speed axle, while providing a two-speed axle which is shiftable during movement of the motor vehicle and maximizing the ability to control the axle electronically. A further objective is to provide two driving modes, namely a performance (or towing) mode and a normal (or economy) mode. A further objective is to provide a two-speed transfer gearbox in a four wheel drive vehicle which is shiftable while the vehicle is moving.

SUMMARY OF THE INVENTION

The avoid the difficulties and high cost associated with developing and manufacturing transmissions having a large number of forward speed ratios, the performance and fuel economy advantages can be realized by combining a multiple-speed transmission having fewer speed ratios with a multiple-speed axle assembly. It is desirable to provide a more simple multiple speed axle than provided heretofore. Additionally, synchronization, including electronic control of a multiple-speed axle, may permit shifting while the driveline is engaged. This combination can realize the desired objectives at a lower investment cost and in shorter time and maximize performance. Furthermore, this combination enables a manufacturer to provide two driving modes, one for performance driving or towing, and a second mode for economy driving. Thus the manufacturer may provide improved fuel economy and performance and may reduce the number of axles in the final assembly plant.

To realize these objectives and advantages, a multiple-speed axle assembly for use in a powertrain includes an input shaft, an output shaft and a gearset having first and second members. The first and second members are adapted to produce a direct drive connection between the input shaft and output shaft when said members are connected mutually and to underdrive the output shaft in relation to the input shaft when said members are mutually disconnected and the first member is connected with the case. A coupling is provided for mutually connecting and disconnecting the first and second members and for connecting the first member with the case. A selector actuates the coupling to mutually connect and disconnect the members. An embodiment of the present arrangement includes a synchronizer which enables shifting of the axle while the drivetrain is drivably engaged without objectionable shifting.

In one embodiment of the synchronizer, the coupling comprises a sleeve having splined teeth with conically tapered spline teeth having flat contact surfaces and alternating spline teeth being recessed axially, combined with an axial bias spring, to promote synchronization. In another embodiment, synchronization is enhanced by a computer controlling the rotational speed of the input shaft or output shaft.

DESCRIPTION OF THE PREFERRED EMBODIMENTS

Figure 1:
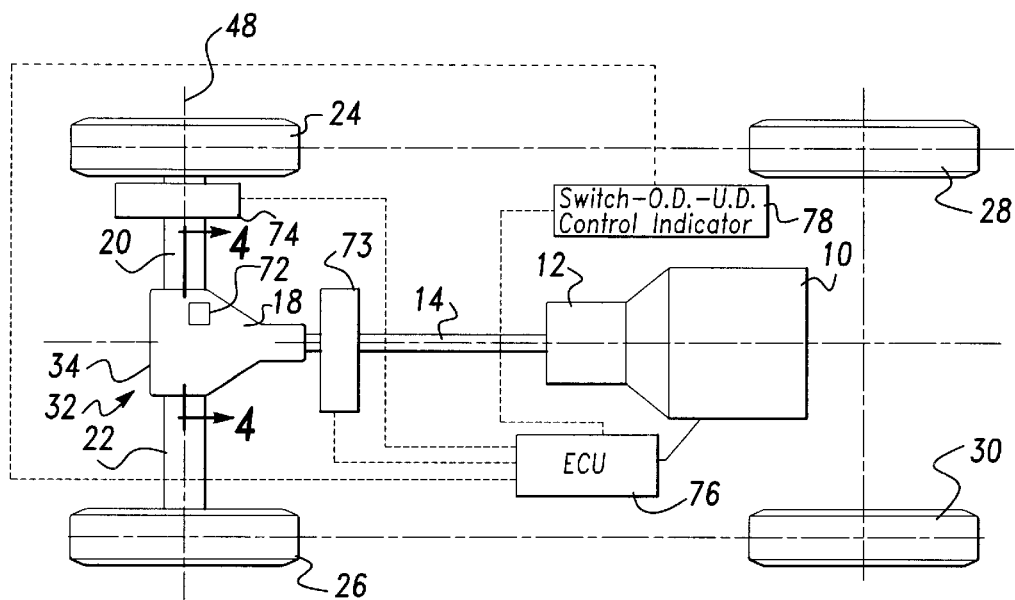
FIG. 1 is a schematic plan view of a powertrain for a motor vehicle that includes a multiple-speed rear axle assembly according to the present invention.

Referring now to FIG. 1, the powertrain for a rear wheel drive motor vehicle includes an engine 10; transmission 12; rear drive shaft 14; rear axle differential 18, left-hand and right-hand rear axle shafts 20, 22; and rear drive wheels 24, 26. The right-hand and left-hand front drive wheels 28, 30 are not driven. The engine 10 is drivably connected to the multiple-speed transmission 12 which is drivably connected to the drive shaft 14, which is connected to the input shaft of a multiple-speed axle drive mechanism 32 located within a case or housing 34.

Figure 2:
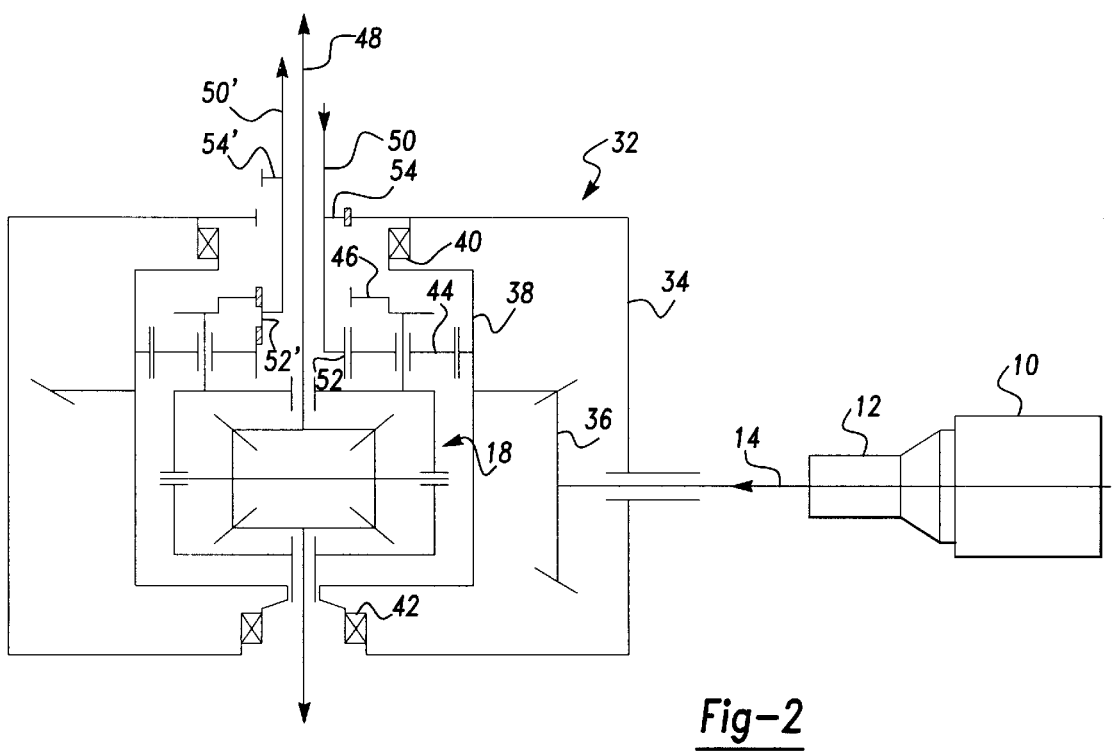
FIG. 2 is a schematic representation of a multiple-speed rear axle according to FIG. 1 showing a kinematic arrangement having a planetary gearset according to the present invention.

Turning now to FIG. 2, drive shaft 14 is connected to a beveled input pinion 36 drivably connected to a ring gear 38 of a two-speed axle 32, according to the present invention, located within housing 34. The ring gear 38 is rotatably supported by the housing 34 at bearings 40, 42. The ring gear 38 is in continual meshing engagement with a plurality of planetary pinion gears 44 supported for rotation by pinion carrier 46. The carrier 46 is in continual driving engagement with an interwheel differential, an example of which is disclosed in U.S. Pat. No. 5,316,106. The differential 18 drives the rear drive wheels 24, 26 about an axis of rotation 48 via axle shafts 24, 26 in a manner known to one skilled in the art.

A coupling 50 is provided in the axle 32 to mutually drivably connect and disconnect the pinions 44 and the carrier 46. The coupling 50 comprises an annular sleeve member coaxial with the axis 48. The coupling 50 carries a sun gear 52 in meshing engagement with pinion gears 44. The coupling 50 also carries a second gear 54 axially displaced from the sun gear 52. The coupling 50 is shown in a first position at the right hand side of axis 48, wherein the coupling 50 provides an underdrive condition by locking pinion gears 44 against rotation with respect to housing 34 when coupling 50 engages housing 34 at the second gear 54.

The coupling 50' is shown at a second position at the left side of the axis 48 in FIG. 2. At this second position, the coupling 50' is axially moved to a second position wherein gear 54' is moved out of engagement with the housing 34. In this second position, the sun gear 52' remains in meshing engagement with pinion gears 44 while sun gear 52' also engages the carrier 46 to mutually rotate the carrier 46 and pinions gears 44 to produce a direct drive ratio. The coupling 50 is disconnected from the housing 34 prior to the sun gear 52" being drivably connected to the carrier 46, otherwise the entire planetary gearset would lock up against rotation.

Figure 3:
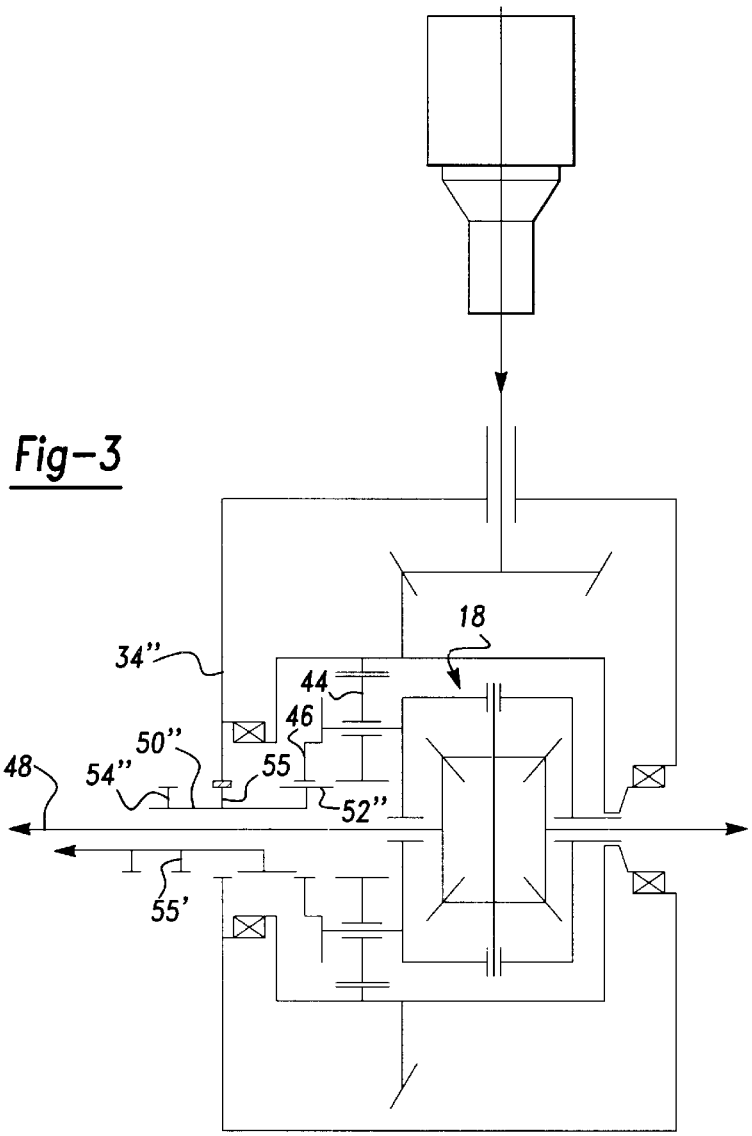
FIG. 3 is a schematic representation of an alternative embodiment of a multiple-speed rear axle according to FIG. 1.

FIG. 3 schematically represents an alternative embodiment wherein the coupling 50 of FIG. 2 has an additional gear 55 not provided in the embodiment shown in FIG. 2, and the coupling 50 is movable to two additional positions beyond the two positions shown in FIG. 2. In this alternative embodiment, the alternative coupling 50" includes a third gear 55, which is engageable with the housing 34" when the coupling 50" is slid further axially to disengage the pinion gears 44. In this embodiment, as shown in the portion of FIG. 3 to the right of axis 48, the coupling 50" is moved to a position where the carrier 46 is engaged with sun gear 52", so the carrier 46 and differential 18 are locked against rotation with respect to the housing 34 through gear 55. In this position of the coupling 50", a park position may be thus provided. An advantage of this park position is that the park function may therefore be eliminated from the transmission or a redundant park system may be provided. A safety must be provided to ensure the vehicle is substantially stopped prior to engaging park, otherwise the wheels 26 would lock while the driveline were rotating.

As shown in FIG. 3, the alternative coupling 50" may be moved further axially to a fourth position as shown in the left portion of FIG. 3. In this fourth position, the third gear 55' disengages the housing 34". In this position, there is no reaction member in the planetary gearset, so torque will not be transmitted through the carrier 46 to the differential 18, and thus a "neutral" position is created within the axle. This "neutral" position may provide, for example, an advantageous towing situation, because the driveline will not be rotatably engaged with the rear drive wheels.

Figure 4:
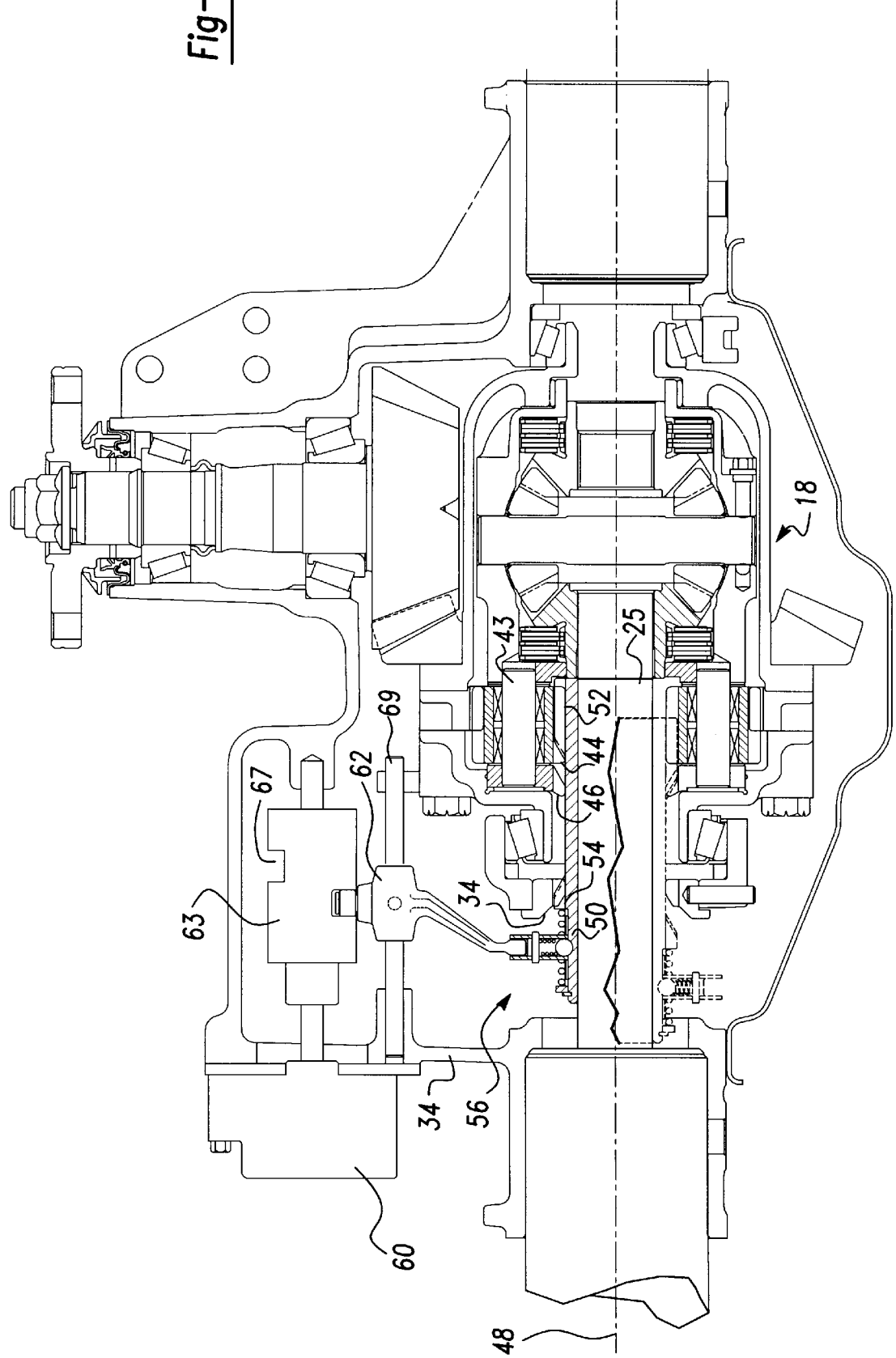
FIG. 4 is a representation of a cross section taken at plane 4—4 of FIG. 1.

In FIG. 4, the carrier 46 illustrated in FIG. 2 is drivably connected to the differential through a plurality of pins 43. The pinion gears 44 are rotatably supported on the pins 43. In a preferred embodiment the coupling 50 is rotatably supported by planet pinions 44.

In FIG. 4, the coupling 50 is positioned above axis 48 in the underdrive position as described with reference to FIG. 2 and in the direct drive position below the axis 48. As described with reference to FIG. 2, a sun gear 52 is carried by the coupling 50 and is drivably engaged with pinion gears 44 in the underdrive and direct drive positions. A motor 60 is supported by the housing 34. The motor 60 moves a shift fork 62 axially to move coupling 50 to a desired position to obtain the proper axle ratio. A preferred embodiment of the motor 60 comprises a rotary electric motor, rotatably connected to a shift cam 63 through an approximately 58:1 reduction worm gear. Because of the large gearing reduction through the worm gear, only a small electric motor is required. The shift cam 63 includes a spiral groove 67 engaged with the shift fork 62. Thus, as the motor 60 rotates the shift cam 63, the spiral groove 67 urges the shift fork 62 axially. The shift fork 62 is supported on a rod 69 which is supported by the housing 34 for axial movement. Alternatively, one skilled in the art recognizes the motor 60 may comprise a linear electric motor or a vacuum motor or any equivalent motor for imparting such linear travel in the shift fork. Alternatively, a mechanical connection may impart the axial movement of the shift fork 62, such as through a Bowden cable connection as is known to one skilled in the art.

Figure 5:
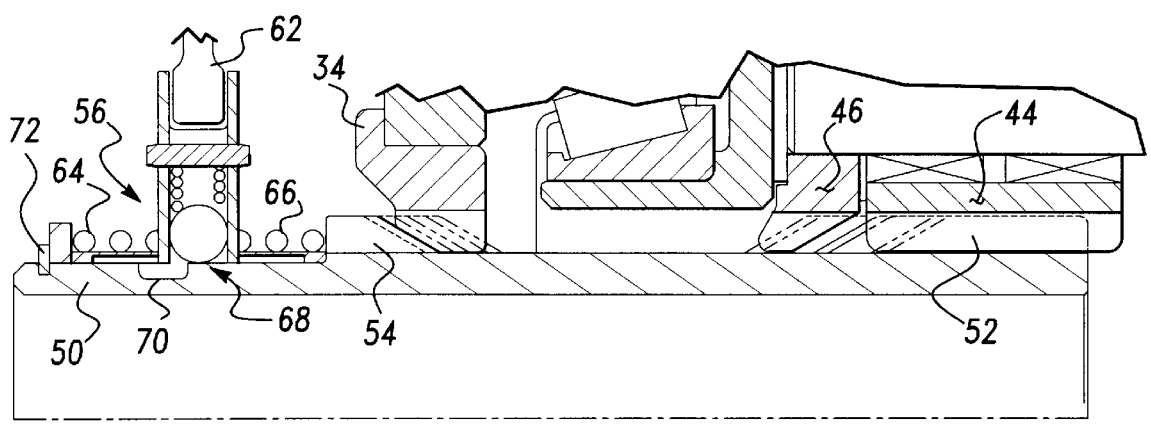
FIG. 5 is an enlarged view of a portion of the mechanism shown in FIG. 4.

The shift cam 63 preferably includes a detent (not shown), preferably comprising a detent position (not shown) in the spiral groove 67. This detent is positioned to correspond with the sleeve 50 in a "synchronizing" position as described below. The spiral of the groove 67 extends helically around the cam 63, so as the cam 63 is rotated by the motor 60, the shift fork 62 is moved axially approximately 4.5 mm past a centered position, which corresponds to "neutral". The centered "neutral" position is where the second gear 54 is not rotatably engaged with the housing 54 and the sun 52 is not engaged with the carrier 46. Preferably as illustrated in FIG. 5, the second gear 54 is nearly immediately adjacent the housing 34 at the neutral position, while the sun 52 is approximately 2.0 mm from engagement with the carrier 46.

The coupling 50 preferably moves axially 9 mm in either direction from the centered neutral position, but begins synchronizing with the housing 34 or carrier 46 when the shift fork 62 is moved approximately 4.5 mm axially on either side of centered neutral, the 4.5 mm position being the "synchronizing" position. At this synchronizing position, within the groove 67, the cam preferably has the detent, comprising a portion of the groove 67 extending circumferentially perpendicular to the axis of rotation of the cam 63 (versus helically), so the shift fork 62 is momentarily not urged further axially by the fork while the shift cam 63 continues to rotate. As shown in FIG. 5, during synchronization, the ball lock mechanism 68 disengages the groove 70 of the sleeve, so the sleeve 50 does not move axially the entire 4.5 mm. While the shift fork 62 is within the detent, the spline teeth of the sleeve 50 are synchronized as described above while the axial spring provides an axial force on the sleeve 50 to urge the sleeve into engagement. As the second gear 54 synchronizes with the housing 34, the spring 66 urges the sleeve rightwardly and the ball lock 68 will again engage the groove 70. Once the cam 63 is rotated past the detent, the groove 67 extends further helically, so that the sleeve 50 is urged axially to fully engage the spline teeth as described above for another approximately 4.5 mm axially. Thus, in this preferred embodiment, the spline teeth are engaged approximately 7–9 mm; however one skilled in the art recognizes these distances are application specific and will vary based on the torque being transmitted, as well as the physical characteristics of the splines and gears.

One skilled in the art recognizes that the detent could alternatively comprise stopping the motor 60 at the point where the shift fork 62 is moved axially within groove 67 approximately 4.5 mm, so the synchronization and initial engagement of the spline teeth occur as described above. Sensor(s) (not shown) preferably detect synchronization, i.e. when the spline teeth are initially engaged, and the motor 60 is started again to rotate until the spline teeth fully engaged.

A resilient connection 56, described in further detail below, is provided between the shift fork 62 and the coupling 50 to ensure proper force is applied during engagement of the various members 52, 44, 46, 54, 34 to enable proper synchronization and smooth engagement thereof. One skilled in the art recognizes that an equivalent resilient connection 56 may be provided between the motor 60 and shift fork 62. The resilient connection 56 enables the motor 60 to move the shift fork 62 to an absolute axial position, while the coupling 50 may not necessarily be fully engaged and therefore not properly axially aligned with the shift fork 62.

As shown in FIG. 5, the resilient connection 56 comprises a pair of pre-loaded axial compression springs 64, 66 provided between the shift fork 62 and the coupling 50. The springs 64, 66 are axially opposed, each applying an axial force on the coupling 50 when the shift fork 62 is moved in the direction of the particular spring 64, 66. Thus as shown in FIG. 5, the shift fork 62 is moved rightwardly and spring 66 is compressed, thereby imparting an additional axial force on coupling 50 through gear 54 until the gears are engaged and the shift fork 62 and coupling 50 are aligned. The springs 64, 66 are selected to provide a proper force on the coupling 50 to ensure proper synchronization and full engagement. The springs thus apply an axial force on the coupling 50. Once the spline teeth described below are aligned on the various members 52, 44, 46, 54, 34 to be engaged, the spring force urges the coupling to snap into engagement with the member. Likewise, when the shift fork 62 is moved leftwardly, the second spring 64 imparts a leftward force upon coupling 50 through a stop 72 provided on the coupling 50 to provide proper synchronization and engagement force as described above.

Preferably, the resilient connection 56 further includes a ball lock mechanism 68 provided on the shift fork 62. The ball lock mechanism 68 is radially displaceable from engagement in a groove 70 provided on coupling 50. Thus, when the motor 60 rotates and moves the shift fork 62 axially, which then urges the coupling 50 rightwardly to engage the gear 54 with the housing 34, if the spline teeth on gear 54 and housing 34 are not synchronized, the spline teeth axially oppose each other at the conical portion of the spline teeth described below with reference to FIG. 6. Because the motor 60 forces the shift fork 62 rightwardly beyond the centered "neutral" position before the rotational speeds are synchronized, the unsynchronized opposing spline teeth resist axial movement of the coupling 50. This resistance causes the ball lock 68 to come out of engagement from the groove 70, but the axial spring 66 continues to impart an axial force upon the coupling 50 to engage the second gear 54 with housing 34. Once the rotational speeds are synchronized, the spline teeth on the gear 54 engages the housing 34 and the axial spring 66 causes the coupling 50 to move rightwardly into engagement with the housing 34 and the ball lock mechanism 68 is aligned with the groove 70 and is engaged therein. Likewise, when the sun gear 52 engages the carrier 46, the shift fork 62 is moved leftwardly. The ball lock mechanism 68 disengages the groove 70 leftwardly and the second spring 64 urges the coupling 50 leftwardly until the coupling 50 is synchronized with the carrier 46 and engaged therewith, allowing the coupling 50 to align the groove 70 with the ball lock mechanism 68 of the shift fork 62.

As shown in FIG. 5, the coupling 50 is illustrated in a position where the motor 60 has moved the shift fork 62 rightwardly and disengaged the ball lock mechanism 68. Because the second gear 54 is not synchronized with the housing 34, the second gear 54 occupies the leftward position abutting the housing 34 as shown in FIG. 5. As the second gear 54 synchronizes rotation with the housing 34, the second gear 54 moves rightwardly as illustrated in phantom. During this rightward movement, the sun gear 52 also moves rightwardly, away from the carrier 46. As shown the FIG. 5, during synchronization of the coupling 50 with the housing 34, the sun gear 52 occupies the center position shown in the right hand portion of FIG. 5. In this position, sun gear 52 is spaced axially approximately 2 mm from the carrier 46, and is therefore not engaged with carrier 34 and the drive is in a "neutral" state. As the coupling 50 moves rightwardly into the underdrive position as described above, or leftwardly, into the direct drive position as described above, the sun occupies the respective position as shown in phantom.

Figure 6:
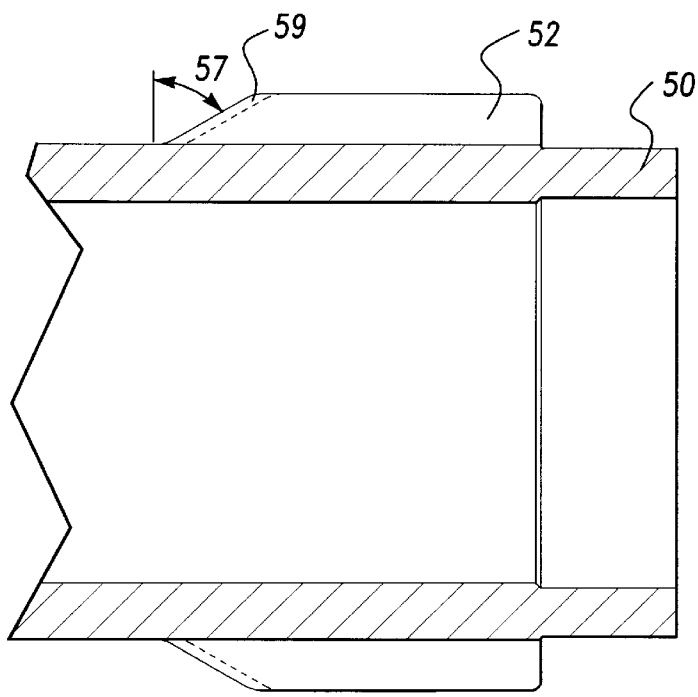
FIG. 6 is a partial sectional view of the coupling shown in FIG. 4.
Figure 7:
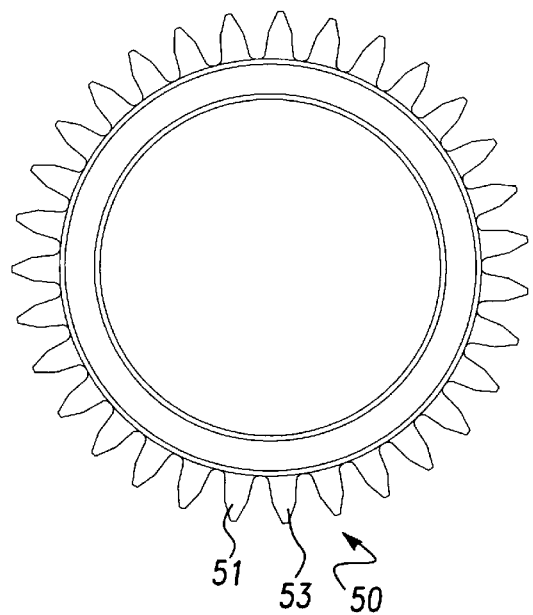
FIG. 7 is an end view of the coupling shown in FIG. 6.

The engagement of the members 52, 44, 46, 54, 34 is provided through a plurality of circumferentially spaced spline teeth. As shown in FIG. 6, the sun gear 52 is preferably formed integrally on the sleeve 50. As shown in end view FIG. 7, the sun gear 52 comprises a plurality of circumferentially spaced spline teeth 51, 53. The sun gear 52 teeth 51, 53 have flat contact surfaces for engagement with complimentary teeth provided on the pinion gears 44 and the carrier 46. As is known to one skilled in the art, the flat contact surfaces of the teeth 51, 53 may include small spiral shaped grooves (not shown) for carrying lubrication.

Figure 8:
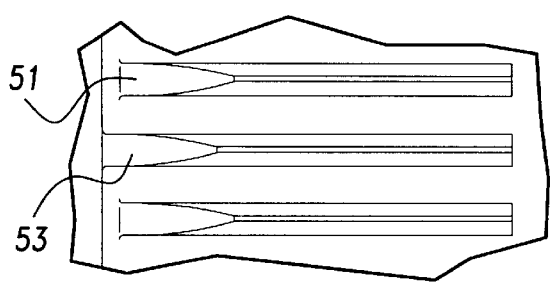
FIG. 8 is a partial side view of the spline teeth of the coupling shown in FIG. 6.

In a preferred embodiment, the teeth are synchronized mechanically. As shown in FIG. 8, every other tooth 51 is preferably recessed axially from adjacent teeth 53, so lockup is more easily obtained at synchronizing speeds. If the rotational speeds are synchronized electronically as explained below, the recessed teeth are less necessary. As is shown in FIG. 6, the teeth of sun gear 52 include a cone angle 57 optimized for synchronization with a complimentary cone angle provided on the teeth of the carrier 46. The teeth of the sun gear preferably further include a tapered surface 59 at the leading edge of the teeth 51, 53 to facilitate engagement of the sun gear 52 and carrier 46. The spline tooth spacing is optimized to minimize backlash. The second pair of teeth 54 on the coupling 50 are similarly formed to synchronize the rotational speed of the coupling 50 when engaging the teeth on the housing 34

In another preferred embodiment, the rotational speeds of the members 52, 44, 46, 54, 34 are synchronized electronically using the engine controller and/or the antilock braking system of the motor vehicle. As shown in FIG. 1, sensors 73, 74 are provided to measure the rotational speed of the input and output of the differential 18. The input speed is preferably measured by obtaining the output speed of the transmission 12 using sensors 73, 74 as is known in the art. Based on the reduction of the input pinion 36, the rotational speed of the ring gear 38 is known. The rotational speed of the pinion gears 44, sun gear 52, and carrier 46 is calculated based on the position of the coupling which mutually connects and disconnects several of the members 52, 44, 46, 54, 34 as described above.

The output speed of the differential 18 is preferably inferred by measuring the rotational speed of the wheel 24 using an antilock braking system including an ABS sensor 74, as is known in the art. The speed of the wheel 24 may be used to estimate the rotational speed of the carrier 46 when differential action is not occurring. Thus, to electronically control the synchronization of the members 52, 44, 46, 54, 34, the input speed of the input gear 36 or output speed of the differential 18 may be controlled. Preferably, the sensors 73, 74 send a signal to a computer 76, such as an engine control unit (ECU). The computer 76 then determines whether it is proper to have the axle in an underdrive or direct drive position based on the rotational speeds of the driveline. Once this determination is made, the computer 76 provides a signal to control the rotational speeds of the input or output shaft to synchronize the rotation of the members 52, 44, 46, 54, 34. The speeds are synchronized by using the ECU to increase or decrease the rotational speed of the engine 10 or transmission 12 in a manner known to one skilled in the art, or by decreasing the output rotational speed of the differential 18 by using the antilock brake system (ABS) to apply a brake at one or more of the rear wheels 48, 26 as is also known to one skilled in the art. As the rotational speeds are thus synchronized, the motor 60 is commanded by the computer 76 to move the shift fork 62 to the desired position to create the proper ratio. A further sensor 72 senses the position of the shift fork 62 to determine if the shift fork is in the proper position to obtain the desired ratio. The rotational speed sensors 73, 74 then measure the rotational speeds and the computer 76 calculates whether the proper ratio is actually engaged.

Selection of the underdrive ratio may be performed automatically by the computer 76 commanding a shift when appropriate as described above. Otherwise, such a shift may be commanded manually by the operator moving a lever or a switch 78 to an underdrive position. Preferably the switch 78 includes a digital display to indicate the presently engaged ratio. For example, a light may be illuminated when underdrive is engaged. Alternatively, an indicator may be provided on the instrument panel cluster to indicate the ratio.

The present invention may be used to multiply the number of gear ratios in an existing transmission. In such an arrangement, a shift of the axle may be commanded simultaneously during a shift of a gear in the transmission to multiply the transmission ratio across the axle to obtain a wider range transmission. For example, third gear may be reduced using the axle to produce a final drive ratio between first and second gears in the transmission. In such an example, movement of a manual shift lever to what was previously second gear position would cause third gear to be engaged and the axle simultaneously shifted to underdrive. Upon movement of the shift lever to what was previously third gear, the second gear would be engaged and the axle simultaneously shifted to the direct drive position.

Although described here with reference to a differential on a rear wheel drive vehicle, the present concepts may readily be applied by one skilled in the art to another drive configuration. For example, the present invention may be added before or after the transmission in either a front wheel drive or rear wheel drive vehicle. In such an instance, the input to the ring gear would be a direct rotational input instead of a beveled pinion gear as illustrated in the Figures. Furthermore, although the present application refers to an underdrive ratio across the planetary gearset, in a preferred embodiment, the input gear ratio (for example the beveled pinion ratio) is adjusted so the so-called "underdrive ratio" comprises the equivalent of a direct drive ratio and the so-called "direct drive" ratio comprises an overdrive ratio. As would be appreciated by one skilled in the art, the present invention is capable of doubling the number of gear ratios produced by a transmission. For example, a four speed transmission may be used in an application to provide eight forward speed ratios using an axle according to the present invention.

Although not illustrated here, one skilled in the art may also apply the present invention in an application including a four wheel drive transfer case. The planetary gearset would provide a gearing reduction in a transfer case to provide a reduction from a four wheel high ratio to a four wheel low ratio. The present invention enables such a reduction to occur while the vehicle is moving, as the synchronization device and techniques taught herein provide for such reduction in a transfer case.

The forms of the invention shown and described herein constitute the preferred embodiments of the invention; they are not intended to illustrate all possible forms thereof. The words used are words of description rather than of limitation, and various changes may be made from that which is described here without departing from the spirit and scope of the invention.

We claim:

1. A multiple-speed axle assembly housed in an axle case, the axle assembly comprising:

an input shaft;

an output shaft;

a gearset having a planetary pinion gear and a carrier mounted for revolution about the axis of the output shaft, adapted to produce a direct drive connection between the input shaft and output shaft when said pinion and gear are connected mutually and to underdrive the output shaft in relation to the input shaft when said pinion and gear are mutually disconnected and the pinion is connected with the case, the gearset further comprising a ring gear driveably connected to the input shaft and a gear wheel rotatably supported on the carrier in meshing engagement with the ring gear and the planetary pinion gear;

a coupling for mutually connecting and disconnecting the pinion and gear and for connecting the pinion with the case, the coupling comprising a sleeve alternately slidably engageable with the pinion and gear, and the pinion and the case, the sleeve being slidably engageable with the carrier and the case to provide a park position; and a selector for actuating the coupling to mutually connect and disconnect the pinion and gear.

2. The assembly of claim 1, wherein the sleeve is further slideable to mutually disengage the pinion and gear, and the pinion and the case to provide a neutral position.

3. A multiple-speed axle assembly housed in an axle case, the axle assembly comprising:

an input shaft;

an output shaft;

a gearset having a planetary pinion gear and a carrier mounted for revolution about the axis of the output shaft, adapted to produce a direct drive connection between the input shaft and output shaft when said pinion and gear are connected mutually and to underdrive the output shaft in relation to the input shaft when said pinion and gear are mutually disconnected and the pinion is connected with the case, the gearset further comprising a ring gear driveably connected to the input shaft and a gear wheel rotatably supported on the carrier in meshing engagement with the ring gear and the planetary pinion gear;

a coupling for mutually connecting and disconnecting the pinion and gear and for connecting the pinion with the case, the coupling comprising a sleeve alternately slidably engageable with the pinion and gear, and the pinion and the case;

a selector for actuating the coupling to mutually connect and disconnect the pinion and gear; and a synchronizer to synchronize the rotational speeds of the first and second members for mutual connection.

4. The assembly of claim 3, wherein the coupling further comprises said sleeve carrying a first set of spline teeth and a second set of spline teeth axially spaced, and said pinion and carrier comprise a third set and fourth set of spline teeth, respectively, for engagement with said first set of spline teeth, and said case comprises a fifth set of spline teeth for engagement with said second set of spline teeth, the synchronizer comprising the first set of spline teeth having at least one tooth of greater length than the other teeth of the first set of spline teeth for engagement with the third and fourth set of spline teeth for synchronization therebetween.

5. The assembly of claim 4, wherein the axle drivably engages a pair of rear wheels of a motor vehicle rotatable about an axis of rotation, wherein the first member is drivably connected to a beveled pinion gear driven by a driveshaft, the first and second members are rotatably supported about the axis of rotation for the rear wheels and wherein the carrier is drivably connected to an input of a differential drivably connected to the rear wheels.

6. The assembly of claim 5, wherein the first spline teeth are continually engaged with the third set of spline teeth.

7. The assembly of claim 4, wherein the selector comprises:

a shift fork supported by the case for axially sliding the coupling; and an axial spring provided between the shift fork and the coupling for resiliently urging the coupling axially when said shift fork is moved axially.

8. The assembly of claim 7, wherein the selector further comprises a spring loaded ball lock for axially engaging the fork and coupling to impede relative axial movement between the coupling and fork.

9. The assembly of claim 7, wherein the selector further comprises a motor for axially moving the shift fork.

10. The assembly of claim 7, wherein the synchronizer comprises said spline teeth comprising conically tapered spline teeth having flat contact surfaces and alternating spline teeth being recessed axially to promote synchronization.

11. The assembly of claim 3, wherein said synchronizer further comprises a computer to control the rotational speed of one of the input shaft and output shaft for synchronizing rotational speed of the first and second members for mutual connection.

12. The assembly of claim 11 further comprising an antilock braking system to control the rotational speed of the output shaft.

13. The assembly of claim 4, wherein said synchronizer further comprises a computer to control the rotational speed of one of the input shaft and output shaft for synchronizing rotational speed of the first and second members for mutual connection.

14. A method of producing two speed ratios in a multiple-speed axle assembly housed in a case, the axle assembly including an input shaft, an output shaft, a gearset having first and second members adapted to produce a direct drive connection between the input shaft and output shaft when said members are connected mutually and to underdrive the output shaft in relation to the input shaft when said members are mutually disconnected and the first member is connected with the case, a coupling for mutually connecting and disconnecting the first and second members and for connecting the first member with the case, and a selector for actuating the coupling to mutually connect and disconnect the members, the method comprising:

mutually connecting the first and second members with the coupling to produce a direct drive ratio;

mutually disconnecting the first and second members and connecting the first member to the case with the coupling to produce an underdrive ratio; and providing axially alternating elongate teeth on one of the members to synchronize the rotational speed of the first and second members prior to mutually connecting the first and second members.

15. The method of claim 14, further comprising the step of sliding a coupling having a set of conical teeth to engage two complimentary sets of teeth on the first and second members, respectively, to mutually connect the first and second members.

16. The method of claim 15, further comprising the step of energizing a motor to slide the coupling.

17. The method of claim 15 further comprising the step of using a computer to control the rotational speed of one of the group comprising the input shaft and output shaft to synchronize the rotational speed of the first and second members.

18. The method of claim 16, further comprising the step of resiliently engaging the motor and coupling to synchronize the members during engagement.

19. The method of claim 18, wherein the step of resiliently engaging the motor and coupling comprises providing a selector between the motor and coupling and providing a spring between one of the motor and selector or selector and coupling.

20. A method of producing two speed ratios in a multiple-speed axle assembly housed in a case, the axle assembly including an input shaft, an output shaft, a gearset having first and second members adapted to produce a direct drive connection between the input shaft and output shaft when said members are connected mutually and to underdrive the output shaft in relation to the input shaft when said members are mutually disconnected and the first member is connected with the case, a coupling for mutually connecting and disconnecting the first and second members and for connecting the first member with the case, and a selector for actuating the coupling to mutually connect and disconnect the members, the method comprising:

mutually connecting the first and second members with the coupling to produce a direct drive ratio;

mutually disconnecting the first and second members and connecting the first member to the case with the coupling to produce an underdrive ratio; and providing a computer to synchronize the rotational speed of one of the group comprising the input shaft and output shaft to synchronize the rotational speed of the first and second members.

* * * * *